United States Patent
Takaki et al.

(10) Patent No.: US 7,149,758 B2
(45) Date of Patent: Dec. 12, 2006

(54) DATA PROCESSING APPARATUS, DATA PROCESSING METHOD, AND DATA PROCESSING PROGRAM

(75) Inventors: Toshimasa Takaki, Tokyo (JP); Shigenori Maeda, Katano (JP); Joerg Vogler, Hochheim (DE); Gerald Pfeiffer, Aschaffenburg (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 507 days.

(21) Appl. No.: 10/662,449

(22) Filed: Sep. 16, 2003

(65) Prior Publication Data

US 2004/0103106 A1    May 27, 2004

(30) Foreign Application Priority Data

Sep. 27, 2002  (JP)  .............................. 2002-284164
Aug. 28, 2003  (JP)  .............................. 2003-305258

(51) Int. Cl.
*G06F 17/00*    (2006.01)

(52) U.S. Cl. .................. 707/104.1; 707/101; 707/102; 707/103 Y; 707/10; 706/50

(58) Field of Classification Search .................... 707/3, 707/100, 102, 10, 101, 103 Y, 104.1; 717/106; 706/50

See application file for complete search history.

(56) References Cited

U.S. PATENT DOCUMENTS

| | | | |
|---|---|---|---|
| 5,758,049 A | | 5/1998 | Johnson et al. |
| 5,873,080 A | * | 2/1999 | Coden et al. .................... 707/3 |
| 6,012,068 A | | 1/2000 | Boezeman et al. |
| 6,101,423 A | * | 8/2000 | Csipkes et al. ............. 700/117 |
| 6,345,252 B1 | | 2/2002 | Beigi et al. |
| 6,356,902 B1 | | 3/2002 | Tan et al. |
| 6,377,953 B1 | * | 4/2002 | Gawlick et al. ............ 707/102 |
| 2001/0001851 A1 | * | 5/2001 | Piety et al. ................. 702/184 |
| 2001/0056506 A1 | | 12/2001 | Munetsugu et al. |
| 2002/0028005 A1 | * | 3/2002 | Anderson et al. ........... 382/128 |
| 2002/0129371 A1 | | 9/2002 | Emura et al. |

(Continued)

FOREIGN PATENT DOCUMENTS

CN    1270361    10/2000

(Continued)

OTHER PUBLICATIONS

English Language Abstract of JP 09-171501.

(Continued)

*Primary Examiner*—Thuy N. Pardo
(74) *Attorney, Agent, or Firm*—Greenblum & Bernstein, P.L.C.

(57) ABSTRACT

Conventionally, when a multimedia data processing section that has become a component is taken out of a database, it is necessary that the multimedia data processing section is taken out of the database once and a condition determination of this multimedia data processing section and other multimedia data processing sections is performed, and the problem is that a search for a multimedia data processing section is thus time consuming. According to the present invention, not only the body of a multimedia data processing section (130), but also a function entry (120) of a function (140) that performs a condition determination of the multimedia data processing section (130) is registered with a database (101), so that when a search for the multimedia data processing section (130) is performed, the function entry alone is taken out first and a condition determination is performed, and, only when it suits the purpose, the body of the multimedia data processing section (130) is taken out. By this means, search time for the multimedia data processing section (130) can be reduced.

20 Claims, 20 Drawing Sheets

U.S. PATENT DOCUMENTS

| | | | |
|---|---|---|---|
| 2002/0133568 A1* | 9/2002 | Smith et al. | 709/219 |
| 2002/0144234 A1* | 10/2002 | Yeh | 717/106 |
| 2002/0181015 A1* | 12/2002 | Whale | 358/1.15 |
| 2003/0126147 A1* | 7/2003 | Essafi et al. | 707/100 |
| 2003/0187829 A1 | 10/2003 | Emura et al. | |
| 2004/0073913 A1* | 4/2004 | Fairweather | 719/328 |
| 2004/0111284 A1* | 6/2004 | Uijttenbroek | 705/1 |
| 2005/0086188 A1* | 4/2005 | Hillis et al. | 706/50 |

FOREIGN PATENT DOCUMENTS

| | | |
|---|---|---|
| EP | 0570320 | 11/1993 |
| EP | 0889420 | 1/1999 |
| GB | 2335125 | 9/1999 |
| JP | 09171501 | 6/1997 |
| JP | 9 233216 | 9/1997 |
| JP | 2002-304387 | 10/2002 |

OTHER PUBLICATIONS

English language Abstract of JP 9-233216.

English language Abstract of JP 2002-304387.

* cited by examiner

```
Set<Ref<Class Context>>subcontext:
Context->query(subcontext.
"select distinct x form Context-A where \
    x.property.owner="Smith" \
    and x.property.ndata>95.3.16 \
    and x.property.category=\"picture\"""
);
```

PRIOR ART
FIG.2

| | MP4 Atom |
|---|---|
| MEDIA TYPE | Movie->Track->Media->Handler Reference(Component subtype) |
| MEDIA SUBTYPE | Movie->Track->Media->Media Information->Sample Table ->Sample Description->Visual Sample Entry(Type) |
| CODEC | Movie->Track->Media->Media Information->Sample Table ->Sample Description->Visual Sample Entry(ESD) |
| VERSION | Movie->Track->Media->Media Information->Sample Table ->Sample Description->Visual Sample Entry(Decoder_version) |
| AVERAGE BIT RATE | Movie->Track->Media->Media Information->Sample Table ->Sample Description->Visual Sample Entry(ESD) |
| MAXIMUM BIT RATE | Movie->Track->Media->Media Information->Sample Table ->Sample Description->Visual Sample Entry(ESD) |
| NUMBER OF CHANNELS | None |
| SAMPLING FREQUENCY | None |
| WIDTH | Movie->Track->Media->Media Information->Sample Table ->Sample Description->Visual Sample Entry(Width) |
| HEIGHT | Movie->Track->Media->Media Information->Sample Table ->Sample Description->Visual Sample Entry(Height) |

FIG.8

| ITEM | AFTER DEMULTIPLEXING |
|---|---|
| MEDIA TYPE | Video |
| MEDIA SUBTYPE | MPEG-4 |
| CODEC | Simple Profile |
| VERSION | 1.0 |
| AVERAGE BIT RATE | 400 |
| MAXIMUM BIT RATE | 600 |
| NUMBER OF CHANNELS | None |
| SAMPLING FREQUENCY | None |
| WIDTH | 176 |
| HEIGHT | 144 |

FIG.9

| ITEM | MEDIA TYPE DETERMINING FUNCTION |
|---|---|
| MEDIA TYPE | Stream |
| MEDIA SUBTYPE | MP4 |
| CODEC | unspecified |
| VERSION | <=1.0 |
| AVERAGE BIT RATE | unspecified |
| MAXIMUM BIT RATE | unspecified |
| NUMBER OF CHANNELS | unspecified |
| SAMPLING FREQUENCY | unspecified |
| WIDTH | unspecified |
| HEIGHT | unspecified |

FIG.11

DATA PROCESSING APPARATUS, DATA PROCESSING METHOD, AND DATA PROCESSING PROGRAM

BACKGROUND OF THE INVENTION

1. Field of the Invention

The present invention relates to a data processing apparatus that implements processing by reading components configured of software parts assembled to implement a given function, and a component database. More particularly, the present invention relates to a method of holding media data processing components and a method of high-speed reading.

2. Description of the Related Art

Conventional data processing apparatus are often configured such that a database holds the names and properties of components, and a data processing control section searches for components of interest from the names and properties, or, when the information of the names and properties is insufficient, actually reads all components (for instance, see FIG. 1 of Laid-Open Japanese Patent Application Publication No.HEI9-171501).

FIG. 1 shows an overall configuration of a data processing apparatus (in the document, referred to as a resource management apparatus) described in Laid-Open Japanese Patent Application Publication No. HEI9-171501.

Data processing apparatus 10 in the figure comprises context retaining units 11-1~N, property retaining units 12-1~N, name analyzing units 13-1~N, name conversion units 14-1~N, name resolution unit 15, resource realizing unit 16, resource retaining units 17-1~M, resource management unit 18, communication unit 19, context database unit 20, context database search unit 21, context selecting unit 22, and context extracting unit 23.

In context retaining units 11-1 to 11-N, property retaining units 12-1 to 12-N, name analyzing units 13-1 to 13-N, and name conversion units 14-1 to 14-N are respectively provided. In property retaining units 12-1 to 12-N, an arbitrary number of properties attached to context retaining units 11-1 to 11-N, respectively, are retained as a list of pairs of property names and property values.

Name analyzing units 13-1 to 13-N respectively analyze the names of input resources. Name conversion units 14-1 to 14-N respectively receive the results analyzed in name analyzing units 13-1 to 13-N and convert the analysis results into a resource realization expression. A resource realization expression is formed of a resource element string containing a resource search expression as an element, and procedure information used to process the resource element string. A resource search expression is a search expression used to specify the real resources realized in advance in a computer system.

Name resolution unit 15 receives the resource realization expression output from context retaining units 11-1~11-N, and a name resolution result corresponding to some or all of the resource realization expression is output to resource realizing unit 16.

The name resolution result output from the name resolution unit 5 is input into resource realizing unit 6, which outputs the handles of the resources corresponding to the name resolution result.

Resource retaining units 17-1~M respectively retain the resources previously realized, and resource identifiers for identifying these resources are also provided.

Resource management unit 18 manages the resources which resource retaining units 17-1~M retain, and specifies the resources in accordance with the above resource search expression.

Communication unit 19 allows communication between name resolution unit 15, resource realizing unit 16, resource management unit 18, and context database unit 20.

Context database unit 20 manages N context retaining units 11-1~N as a context set, and contains context database search unit 21, context selecting unit 22, and context extracting unit 23.

Context database search unit 21 receives a context search expression, which is described using properties, and searches for context retaining unit 11-i (i is a whole number from 1 to N) which has the properties that satisfy the context search expression from the context set. The search result can be output for example as a set of references corresponding to context retaining unit 11-i.

When a context search expression for use in accomplishing the extraction of a context set is input into communication unit 19 that allows communication between the context database and such, context selecting unit 22 delivers the context search expression to context database search unit 21, obtains and outputs the set of context retaining unit 11-i that satisfies the context search expression to context extracting unit 23.

The set of references corresponding to context retaining unit 11-i is input into context extracting unit 23, which outputs, as the context expression, information necessary to create the set of context retaining units equivalent to context retaining unit 11-i indicated by the references.

For instance, assume that in data processing apparatus 10, the three properties consisting of the property "owner," which represents the owner, "mdate," which represents the modification date, and "category," which represents the category, are retained as a list of pairs of property names and property values in property retaining units 12-1~N. For property retaining unit 12-1, the value of "owner" is "Smith", the value of "mdate" is "95.3.18" and the value of "category" is "picture"; or property retaining unit 12-2, the value of "owner" is "Smith", the value of "mdate" is "95.1.14" and the value of "category" is "picture"; and for all of property retaining units 12-3~N, the value of "owner" is "Bill", the value of "mdate" is "95.3.3" and the value of "category" is "audio," and the operation of context extraction is will be described.

First, a case will be described here where context retaining unit 11 is searched, in which the value of the property "owner" which represent the owner, is equivalent to "Smith", the value of property "mdate," which represents the modification date, is larger than 95.3.16, and the value of the category property "category" is equivalent to "picture."

Context selecting unit 12 delivers a search expression for realizing the above search to context database search unit 21 and searches for context retaining unit having in property retaining unit 12 properties satisfying the search expression. In conformity with Object Query Language, for instance, the search expression will be described as shown in FIG.2. Because only context retaining unit 11-1 and context retaining unit 11-2 satisfy the search expression, context database search unit 21 returns the set formed of a reference for context retaining unit 11-1 and a reference for context retaining unit 11-2 to context selecting unit 22 as a search result.

Context selecting unit 22, which receives the set formed of a reference for context retaining unit 11-1 and a reference for context retaining unit 11-2, inputs the set into context extracting unit 23 and requests that the context retaining units pertinent to the references be extracted, and is thus able to acquire relevant context.

However, with conventional data processing apparatus, when context is added with new properties that cannot be identified by conventional names and properties, the problem arises that the conventional context retaining unit needs to be also reconstructed.

To be more specific, for instance, when the property "size," which represents the file size, is added, all context retaining units need to be reconstructed, which then leads to the problem of increased maintenance load where the number of context retaining units is large or where new properties are added frequently.

SUMMARY OF THE INVENTION

It is therefore an object of the present invention to provide a data processing apparatus, a data processing method, and a data processing program that make reconstruction of database unnecessary upon introduction of a new component.

According to an aspect of the present invention, there is provided a data processing apparatus which includes a processor that performs a plurality of processes on data using a plurality of processing components, a component database that stores a plurality of processing components, each of which performs a predetermined process, a plurality of type determining functions, corresponding to the plurality of processing components, and a plurality of type determining function entries that refer to the plurality of type determining functions, and a determiner that searches through the plurality of processing components by reading at least one of the plurality of type determining function entries, reading at least one type determining function referred to by the at least one read type determining function entry, and determining whether a stored processing component corresponding to the at least one read type determining function is suitable for use as a processing component.

As described above, according to the present invention, reconstruction of database is unnecessary even upon introduction of a new component.

BRIEF DESCRIPTION OF THE DRAWINGS

The above and other objects and features of the invention will appear more fully hereinafter from a consideration of the following description taken in connection with the accompanying drawings wherein one example is illustrated by way of example, in which;

FIG. 2 is a diagram showing a sample search expression in a conventional data processing apparatus;

FIG. 8 diagram showing an example of multiplexed information in accordance with the first embodiment of the present invention;

FIG. 9 is a diagram showing an example of media information in accordance with the first embodiment of the present invention;

FIG. 11 is a diagram showing an example of a table held by a media type determining function in accordance with the first embodiment of the present invention;

DETAILED DESCRIPTION OF THE PREFERRED EMBODIMENTS

Embodiments of the present invention will be explained now with reference to FIG. 3 through FIG. 21. However, the present invention is by no means limited to the herein contained embodiments, and various modifications are possible within the scope of the herein described invention.

First Embodiment

Figure 1:
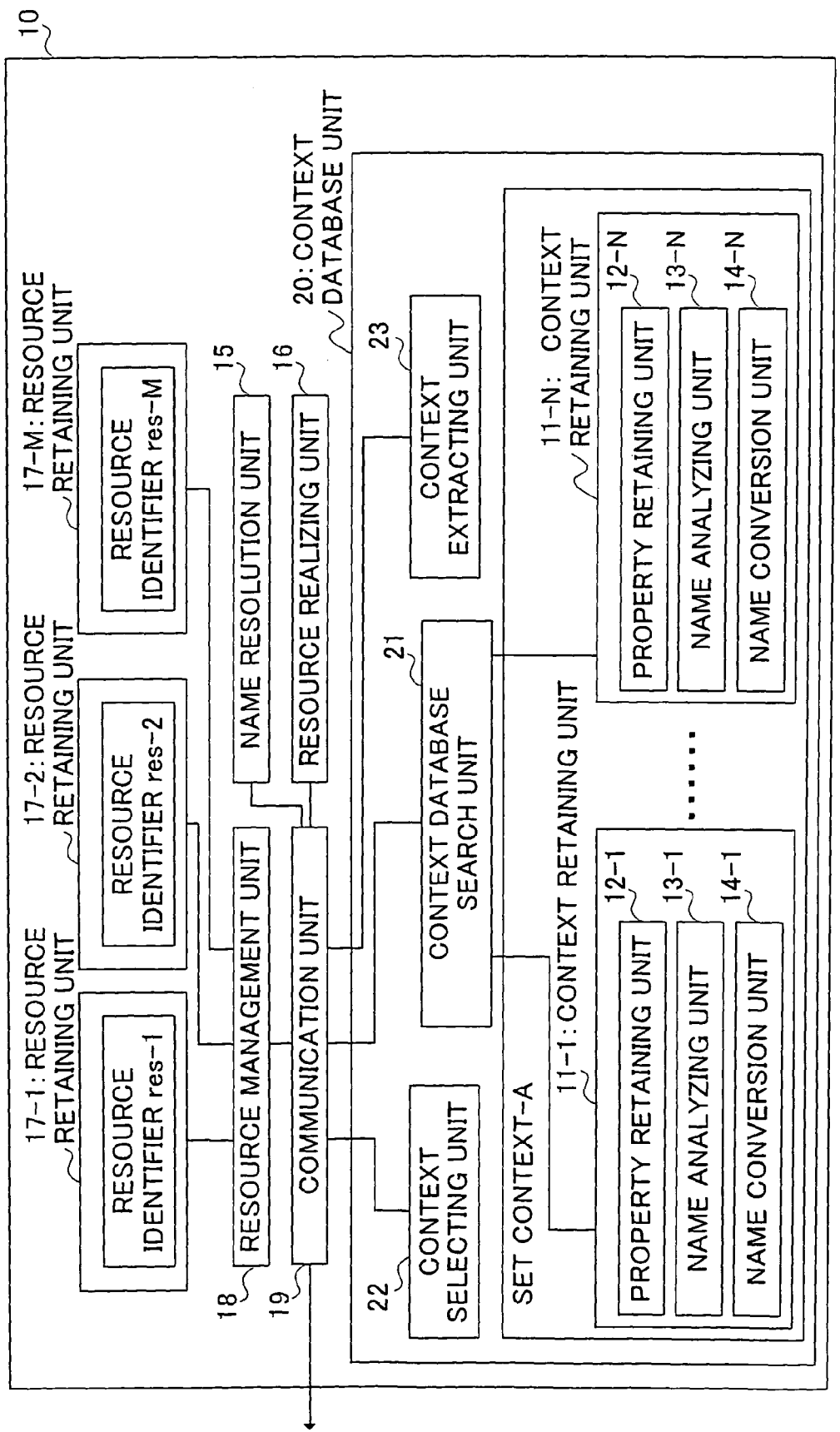
FIG. 1 is a block diagram showing a configuration of a conventional data processing apparatus.
Figure 3:
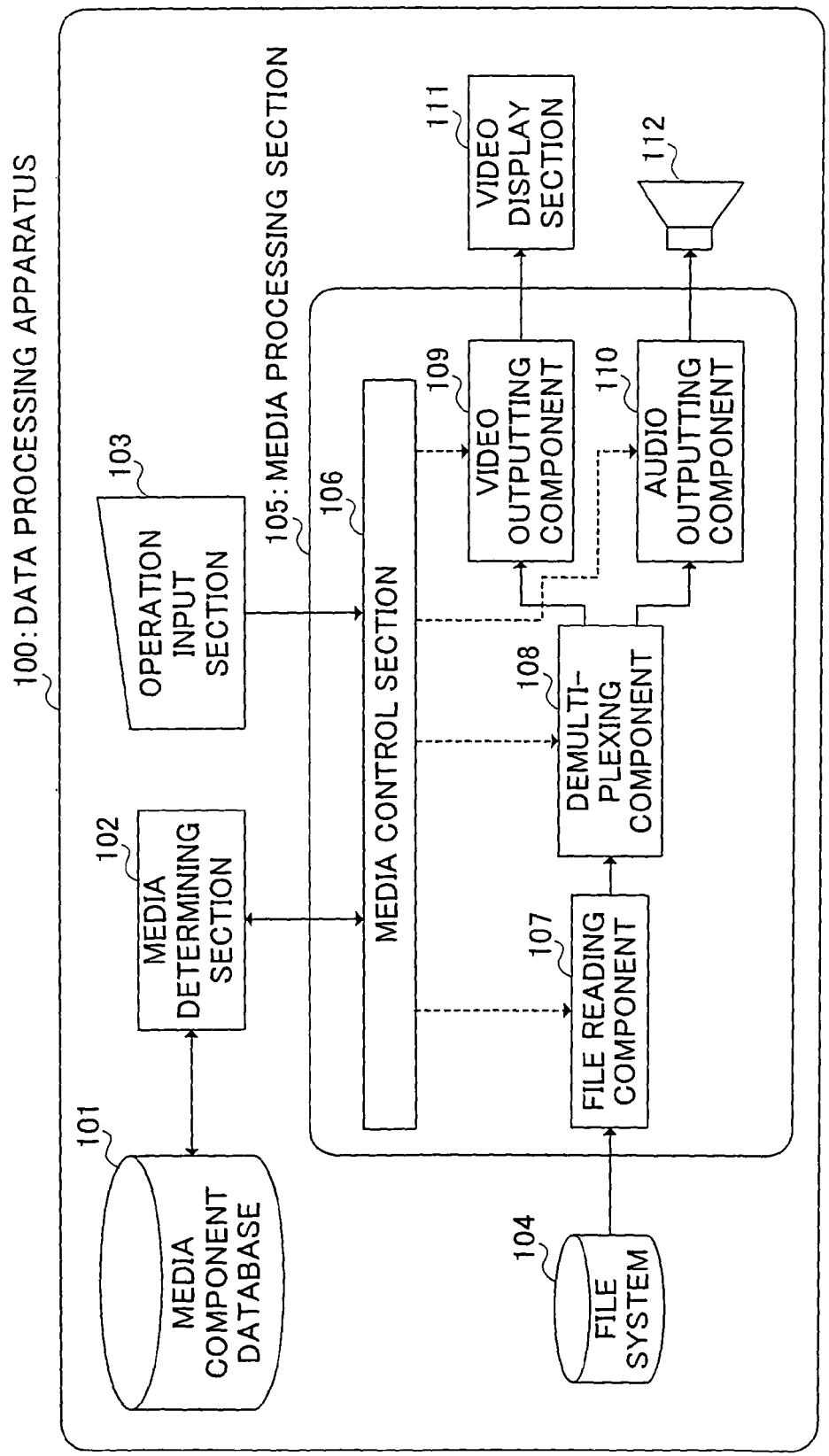
FIG. 3 is a block diagram showing a configuration of a data processing apparatus in accordance with the first embodiment of the present invention.

FIG. 3 is a block diagram showing data processing apparatus 100 in accordance with the first embodiment of the present invention. In FIG. 3, media component database 101 holds media components, which are components for processing media. Media determining section 102 compares the media components and distinguishes them. Operation input section 103 receives input from the user. File system 104 holds multimedia data. Media processing section 105 processes the media. Video display section 111 displays the video. Audio output section 112 outputs the audio.

Figure 4:
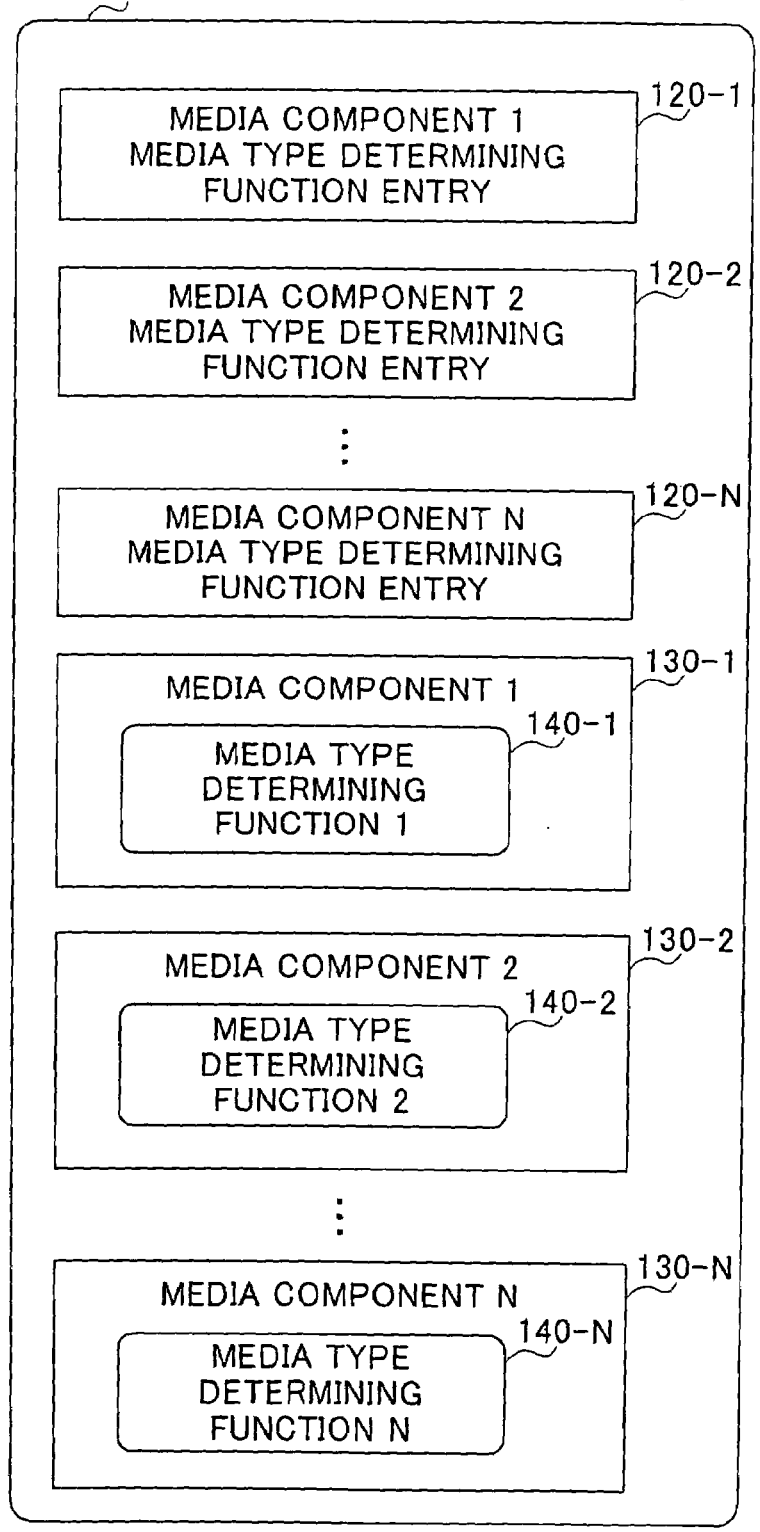
FIG. 4 is a diagram showing a configuration of a media component database in accordance with the first embodiment of the present invention.

FIG. 4 is a diagram showing a manner in which media component database 101 holds components.

Media components 130-1~N are held in media component database 101, and the media components respectively hold media type determining functions 140-1~N for determining as to what type of data the components are applicable. Additionally, in media component database 101, media type determining function entries 120-1~N are held, which are functions that return a reference address to each of media type determining functions 140-1~N.

The operation of data processing apparatus 100 configured as above will be described with reference to FIG. 5 and FIG. 6.

Figure 5:
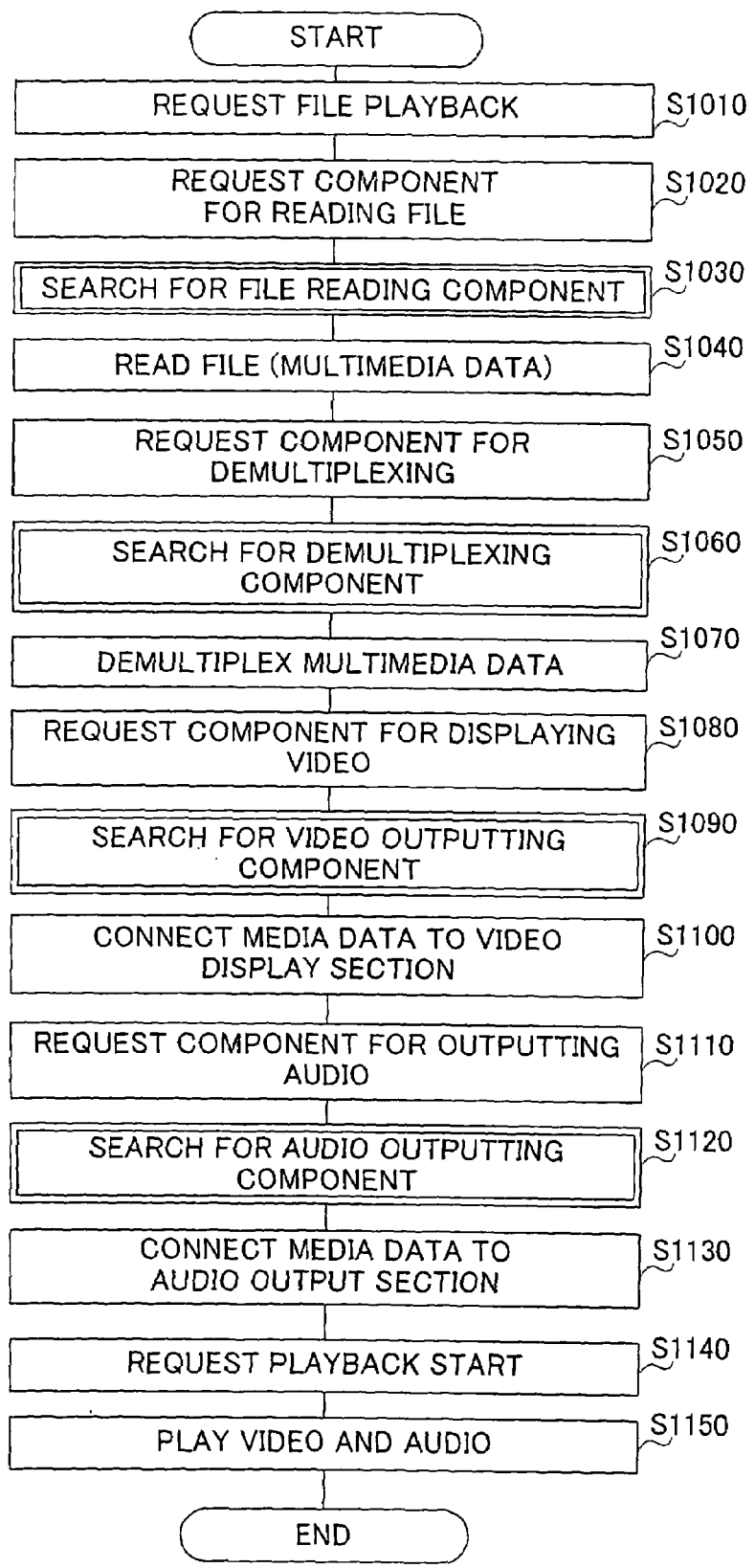
FIG. 5 is a flowchart showing a playback procedure for a multimedia file in accordance with the first embodiment of the preset invention.

FIG. 5 is a flowchart showing a playback procedure for a multimedia file in accordance with the first embodiment of the preset invention.

A file playback request from the user of data processing apparatus 100 is input into operation input section 103, and the file name and the playback request are sent to media control section 106 in media processing section 105 (S1010).

Media control section 106 makes a request for components for reading the specified file (file reading components) to media determining section 102 (S1020).

Media determining section 102, based on the specified file name, searches media component database 101 for components for reading the file (file reading components) (S1030).

Figure 6:
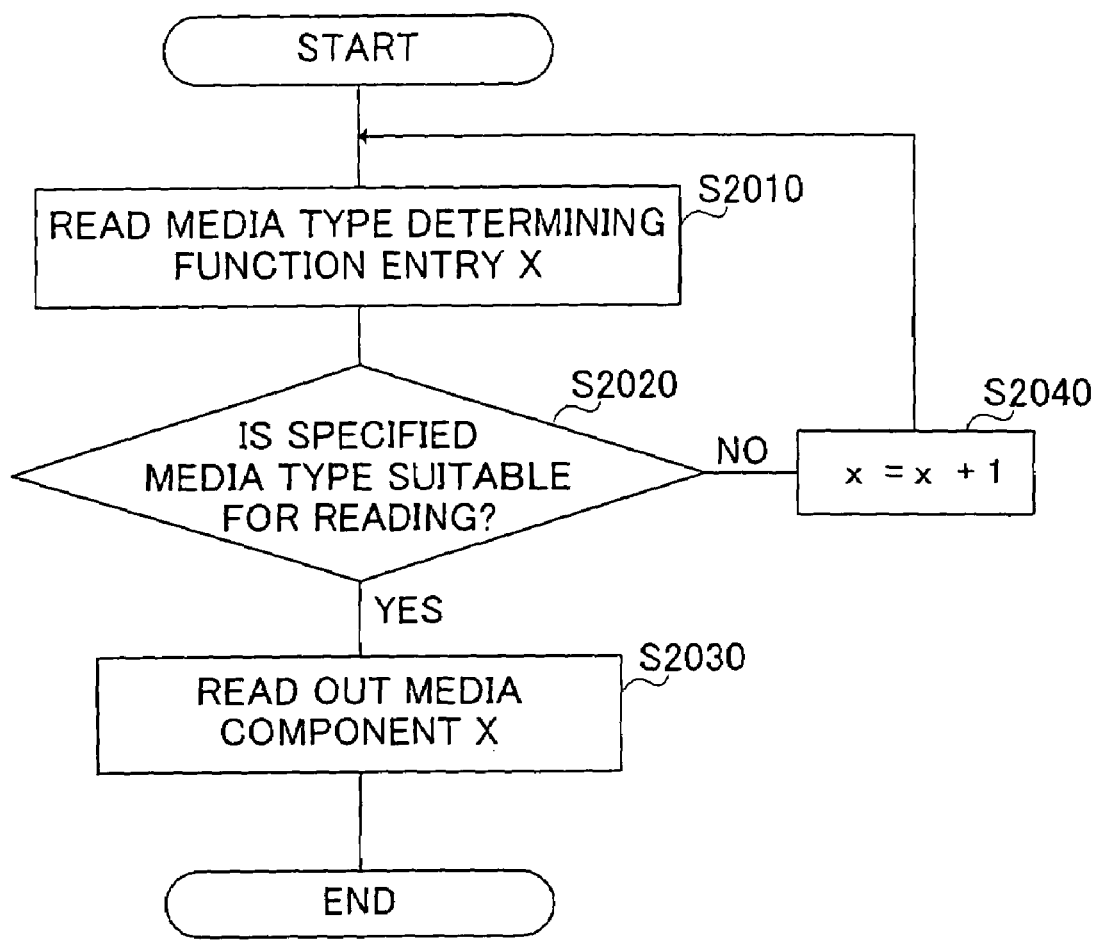
FIG. 6 is a flowchart showing a processing procedure in a media determining section in accordance with the first embodiment of the present invention.

When this search is executed, processing is performed following the flowchart of FIG. 6.

That is, first, media determining section 102 reads media type determining function entry 120-1 from media component database 101 (S2010). Incidentally, assume that in FIG. 6 the initial value for x is 1. Next, using media type determining function 140-1 of media component 130-1, which is the reference destination from media type determining function entry 120-1, and the file name corresponding to the file name specified by the user via operation input section 103, a determination is made as to whether this media component 130-1 is suitable for reading the file on request (S2020).

If the determination result by media type determining function 140-1 reveals that media component 130-1 is not suitable as a processing component for the data corresponding to the user specified file name, the value of x is increased by 1 (S2040), and next media type determining function entry configuration pattern search section 202 is read (S2010). On the other hand, if media component 130-1 is suitable as a processing component, media determining section 102 reads out media component 130-1 from media component database 101 and returns it to media control section 106 (S2030).

By performing the above-described processing in media determining section 102 thus, it is possible to determine whether a media component is suitable as a processing component for user specified data without reading all media components, and thus speed up media component search.

Moreover, when the method of media determination changes or an addition is made thereto, it is sufficient to change only media type determining functions 140-1~N in the components, and reconstruction of the database itself is unnecessary. That is, for instance, when a component that processes a new type of media data is added, conventional art will require reconstruction of the data retaining unit, whereas according to the data processing apparatus of the present invention, it is not necessary to reconstruct the body of each component, and furthermore, by simply changing media type determining functions 140-1~N, it is possible to determine whether or not processing of media data of a new type is possible.

Referring to the flowchart of FIG. 5, media control section 106 uses read file reading component 107 and reads the file from file system 104 (S1040).

Media control section 106 acquires multiplexed data from the information in the read fie, and makes a request for components for demultiplexing it (demultiplexing component) to media determining section 102 (S1050).

Incidentally, the multiplexed information refers to information that is attached to the file held in file system 104 and that lists a number of data types multiplexed on the file. Next, the multiplexed information will be described in detail.

Figure 7:
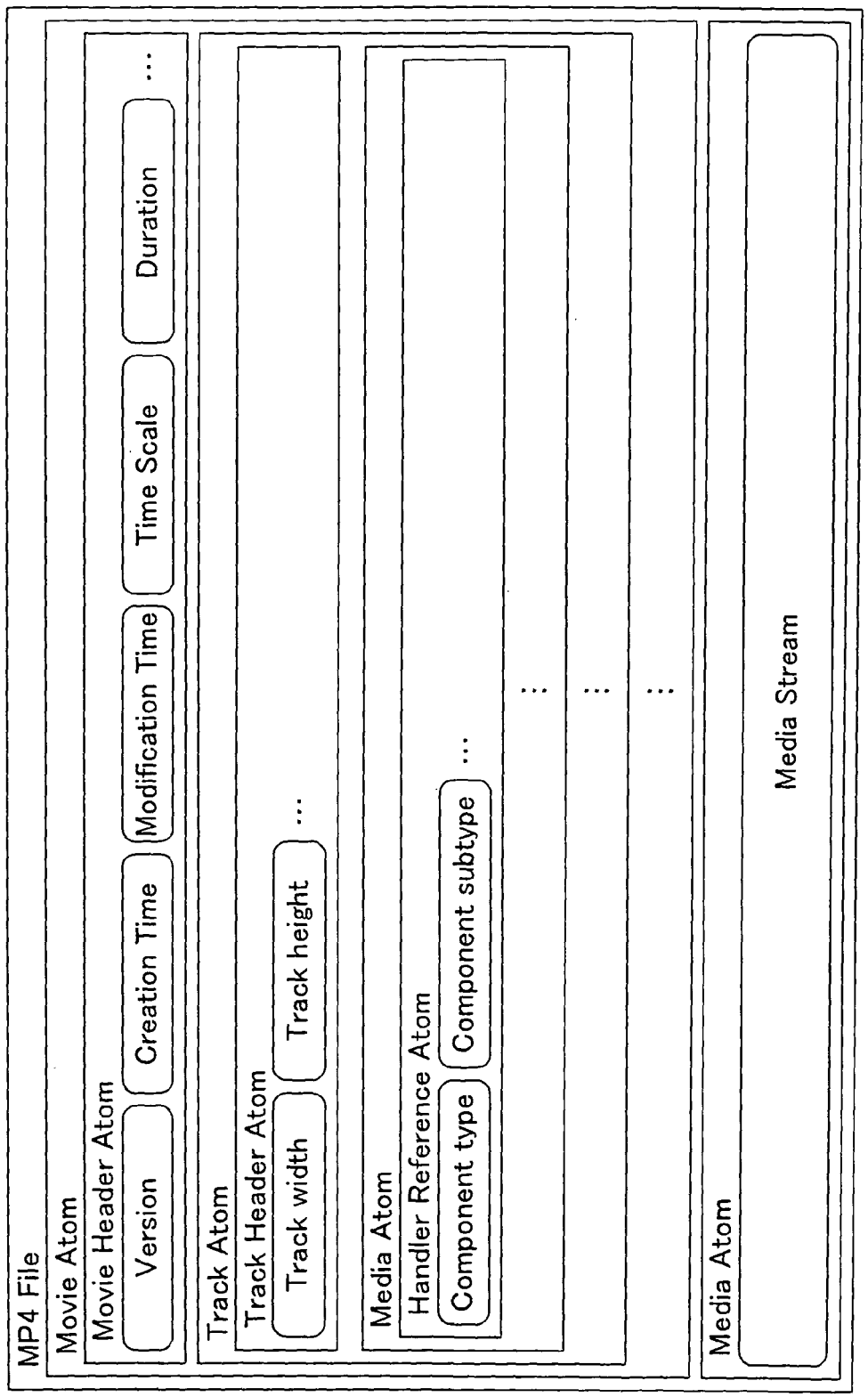
FIG. 7 is a diagram showing a configuration of a multiplexed file in accordance with the first embodiment of the present invention.

FIG. 7 is a diagram showing, conceptually, the condition of a multiplexed file. A multiplexed file (MP4 file) can be largely divided into a region describing bibliographic information of the file (Movie Atom) and a region that stores the body of the file (Media Atom).

Incidentally, the "Movie Atom" region adopts a configuration commonly referred to as a nest structure, and the "Movie Atom" region, inside, is further divided into a number of regions including "Movie Header Atom" and "Track Atom" wherein information is held.

Media control section 106 acquires the bibliographic information in the above "Media Atom," which is necessary for the arguments of media type determining functions 140-1~N, as information that specifies the description location of the above multiplexed file. This information is called multiplexed information.

FIG. 8 shows an example of multiplexed information that media control section 106 acquires. In FIG. 8, for instance, "MEDIA TYPE" is indicated to be described in "Handler Reference" in "Media Atom" in "Track Atom" in "Movie Atom" in the multiplexed file.

Incidentally, although the assumption is made here that a specified file is multimedia data whereupon media data is multiplexed, the present invention is by no means limited to this data type.

Referring to the flowchart of FIG. 5 again, based on multiplexed information input through media control section 106, media determining section 102 searches media component database 101 for components for performing demultiplexing (demultiplexing components) (S1050). The processing of FIG. 6 is performed here as in the processing of S1030, and components suitable for demultiplexing data of interest are selected.

Media control section 106 uses read demultiplexing component 108, and reads multiplexed media data from file reading component 107 and performs demultiplexing (S1070).

Media control section 106 acquires the media information (video) attached to the demultiplexed media data, and makes a request for components for displaying the video (video outputting component) to media determining section 102 (S1080).

To be specific, the media information here has format such as shown in FIG. 9. In the media information, as shown in FIG. 9, items including the media type and the media subtype and the corresponding values and character sequences are described. In FIG. 9, "None" indicates that the item contains no description.

Based on the media information input from media control section 106, media determining section 102 searches media component database 101 for components (video outputting component) for displaying the video (S1090). Here again the processing of FIG. 6 is performed s in the processing of S1030, and components suitable or outputting the data of interest in video are selected.

Figure 10:
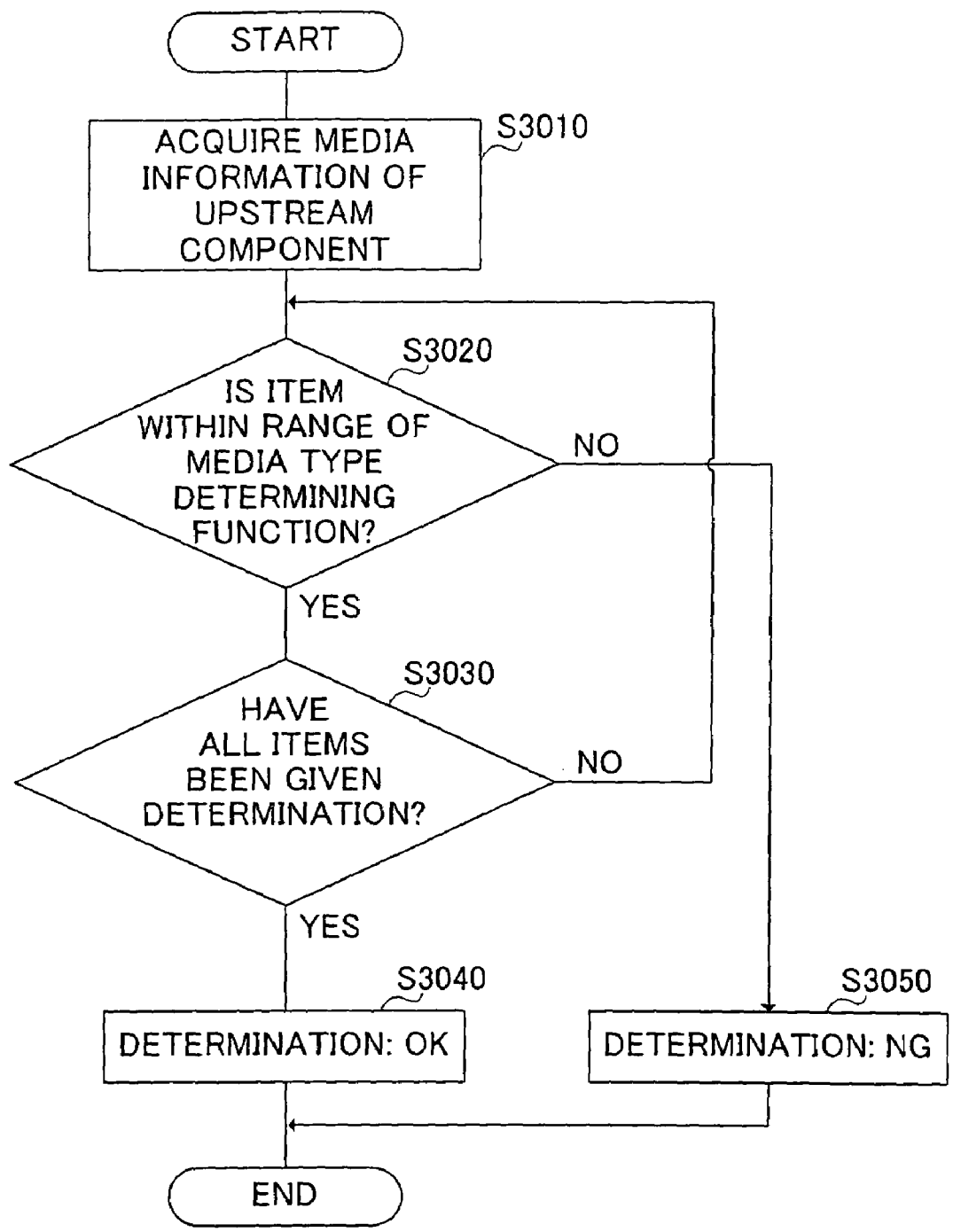
FIG. 10 is a diagram showing an operation of a media type determining function in accordance with the first embodiment of the present invention.

A flowchart showing the operation of media type determining functions 140-1~N in this case is shown as FIG. 10.

First, media type determining functions 140-1~N acquire the media information shown in FIG. 9 from output of an upstream component (S3010). Here, an upstream component refers to a component upon which one earlier processing has been performed. In this case, demultiplexing component 108 is the upstream component. The processing applies to media type determining functions 140-1~N and is repeated until suitable components are found. Next, the operation of media type determining function 140-1 will be described.

Media type determining function 140-1 compares the items of the read media information with a table held in advance, and determines whether each item is within the range of the table held by media type determining function 140-1 (S3020).

FIG. 11 shows an example of a table held by media type determining function 140-1. Media type determining function 140-1 does the comparison for each item, in sequence, and in case an item is outside the range of the value of the table, at this point, the determination will be "NG" (S3050). On the other hand, when an item is within the range, a determination is made as to whether here are any items not yet given a determination by media type determining function 140-1 (S3030). If not all items have been given a determination, S3020 is performed again. If all items have been given a determination, the determination will be "OK" (S3040).

Incidentally, some items in FIG. 11 are "unspecified," and these items need not be subjected to comparison, and it is possible to skip determining whether or not they are within the range.

The above is the operation of media type determining function 140-1. Each of media type determining functions 140-2~N performs the same operation, and thus components suitable for the processing can be selected.

Referring to the flowchart of FIG. 5, media control section 106 connects the output destination for read 109 to video display section 111 (S1040).

Media control section 106 acquires the media information (audio) of the demultiplexed media data, and makes a request for components (audio outputting components) for outputting this audio to media determining section 102 (S1110).

Based on the media information input from media control section 106, media determining section 102 searches media component database 101 for components (audio outputting components) for outputting the audio (S1120). The processing of FIG. 6 is performed again as in the processing of S1030, and components that are suitable for outputting the data of interest in audio is selected.

Media control section 106 connects the output destination for read audio outputting component 110 to audio output section 112 (S1130).

Media control section 106 makes a request for a playback to each component (S1140).

In video display section 111 and audio output section 112, the video and audio are output (S1150).

As described above, when a search for media components is performed, using media type determining functions 140-1~N makes it possible to determine whether or not a component is suitable for processing, without reading all media components, and thus speeds up media component search.

Moreover, when the method of media determination changes or an addition is made thereto, it is sufficient to change only media type determining functions 140-1~N in the components, and reconstruction of the database itself is unnecessary.

As described above, according to the present embodiment, a component has, besides the component body, a type determining function for determining whether or not the component is suitable for processing data of interest, and a data processing apparatus comprises determining means that applies information of a read file or of data processed by the component of the previous stage and output, and by executing a type determination corresponding to each component, it becomes sufficient to change only the type determining functions even when an property for determination changes or added, so that there is no need to update the body of all components (equivalent to the entire context retaining section) and database can be updated with efficiency.

Furthermore, the use of media type determining function entries enables component evaluation by reading only the type determining functions to which the media type determining function entries refer, without acquiring all components from the database, so that time to acquire components of purpose can be reduced.

Second Embodiment

Figure 12:
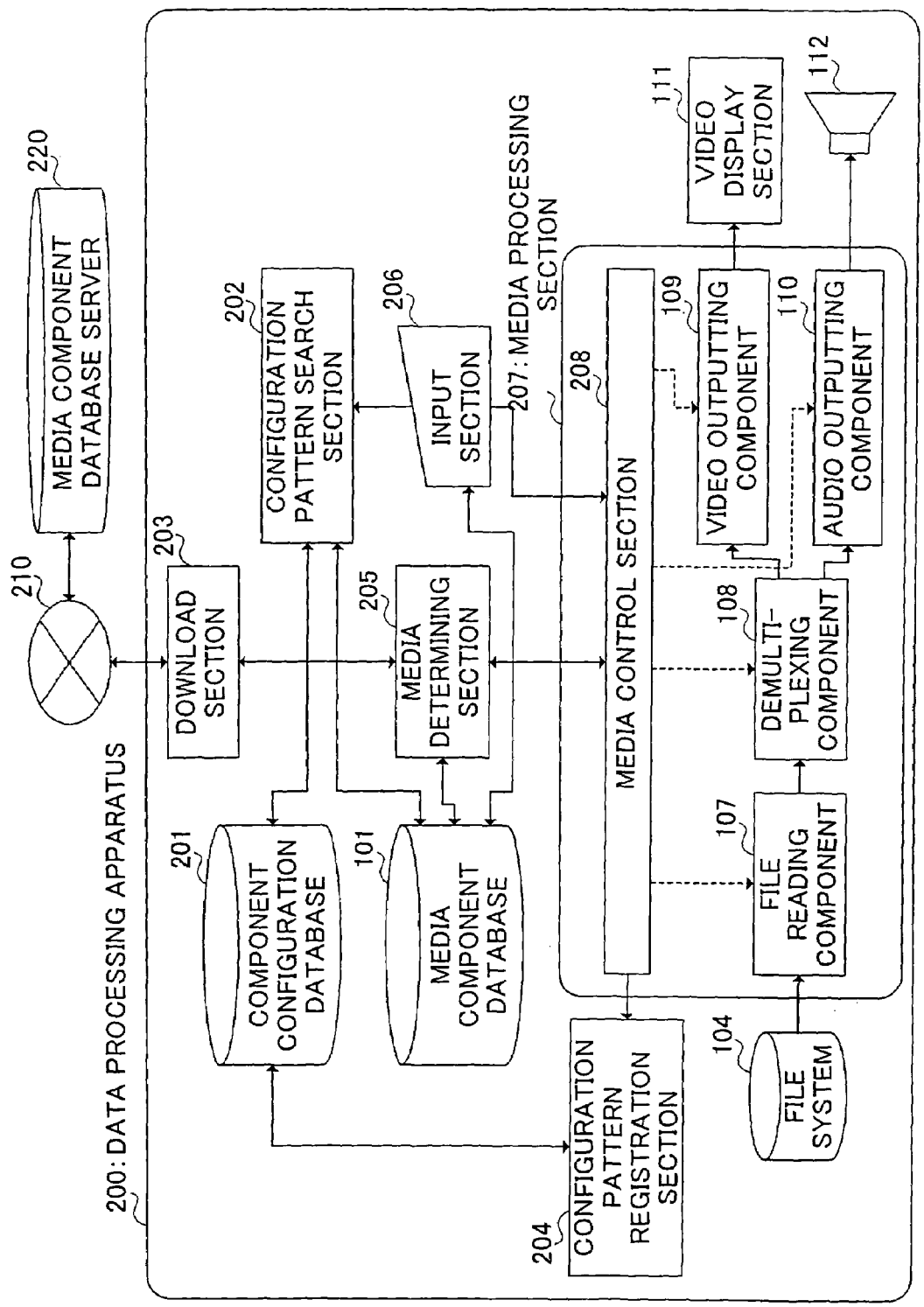
FIG. 12 is a block diagram showing a configuration of a data processing app in accordance with the second embodiment of the present invention.

FIG. 12 is a block diagram showing a configuration of data processing apparatus 200 in accordance with the second embodiment of the present invention. Incidentally, data processing apparatus 200 of the present embodiment has the same basic configuration as that of the data processing apparatus explained in the first embodiment, and components that are identical will be given identical numerals without further explanations.

Data processing apparatus 200 is distinct from data processing apparatus 100 in that, component configuration database 201 that stores the configuration patterns of media components assembled earlier in this data processing apparatus 200; configuration pattern search section 202 that searches component configuration database 201 for configuration patterns of media components that are applicable to data read from file system 104; download section 203 that, when data processing apparatus 200 holds none of the necessary media components inside, downloads the necessary media components from media component database server 220 connected via network 210; and configuration pattern registration section 204 that registers configuration patterns, in which media components are successfully placed, with component configuration database 201 are added, and in that, in place of media determining section 102, operation input section 103, and media processing section 105, media determining section 205, input section 206, and media processing section 207 are provided. Moreover, media processing section 207 comprises media control section 208 in place of media control section 106 in media processing section 105.

One of the main features of the present embodiment is that component configuration database 201 stores the configuration patterns of media components assembled earlier, and based on information of a file (data) subject to processing, a configuration pattern that is suitable for given processing is searched out.

Figure 13:
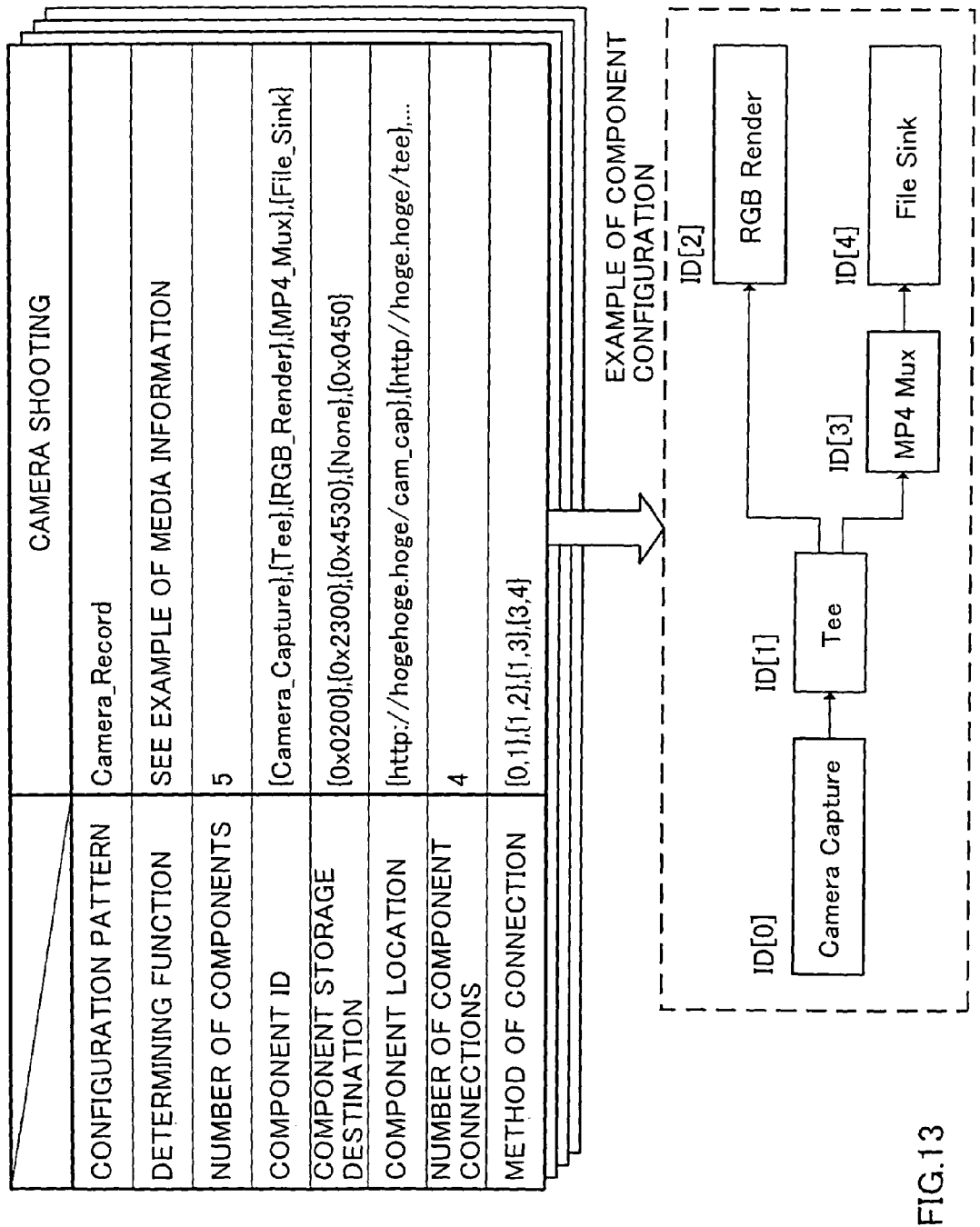
FIG. 13 is a diagram showing an example of a holding table in accordance with the second embodiment of the present invention.

FIG. 13 is a diagram showing an example of a holding table for holding configuration patterns in component configuration database 201.

In this holding table, "CONFIGURATION PATTERN" refers to the configuration pattern name. "DETERMINING FUNCTION" refers to a determining function used when a search for configuration patterns corresponding to media information is made. "NUMBER OF COMPONENTS" refers to the number of components required for processing (five in this example). "COMPONENT ID" refers to the identifier of each component included in a configuration pattern and is used to uniquely specify each component. "COMPONENT STORAGE DESTINATION" indicates at what location (address) in media component database 101 the body of each component is stored. "COMPONENT LOCATION" indicates the address where the body of the component is stored in media component database server 220. "NUMBER OF COMPONENT CONNECTIONS" indicates the number of cords that connect the components. "METHOD OF CONNECTION" indicates the method whereby the components are connected. For instance, {0, 1} indicates that the 0th component (described as ID [0] in the component configuration pattern in FIG. 13), and the first component (described as ID [0] in the component configuration pattern in FIG. 13) in the configuration pattern are connected.

Figure 14:
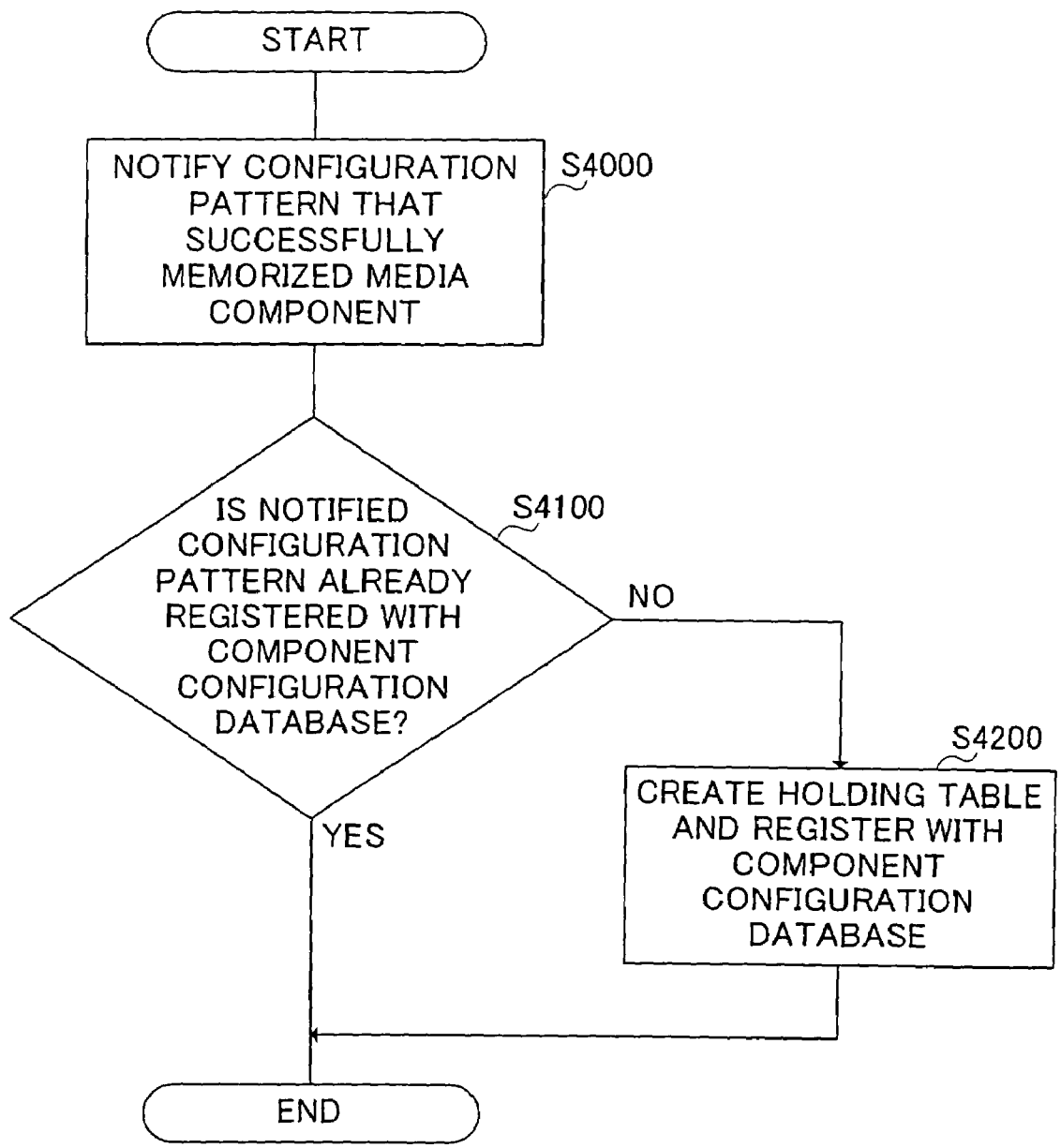
FIG. 14 is a flowchart describing an operation procedure of configuration pattern registration in accordance with the second embodiment of the present invention.

The operation of data processing apparatus 200 configured such as above will be described below. First, registration of media component configuration patterns will be described. FIG. 14 is a flowchart describing the procedure of configuration pattern registration.

First, media control section 208, having successfully positioned media components (that is, when a read file has been adequately processed), notifies configuration pattern registration section 204 of the configuration pattern of the media components (S4000).

Then, configuration pattern registration section 204 sees whether the notified configuration pattern is already registered with component configuration database 201 (S4100), and does nothing when it is already registered, and, when it is not registered, creates a holding table for holding this configuration pattern, and registers it with component configuration database 201 (S4200).

Figure 15:
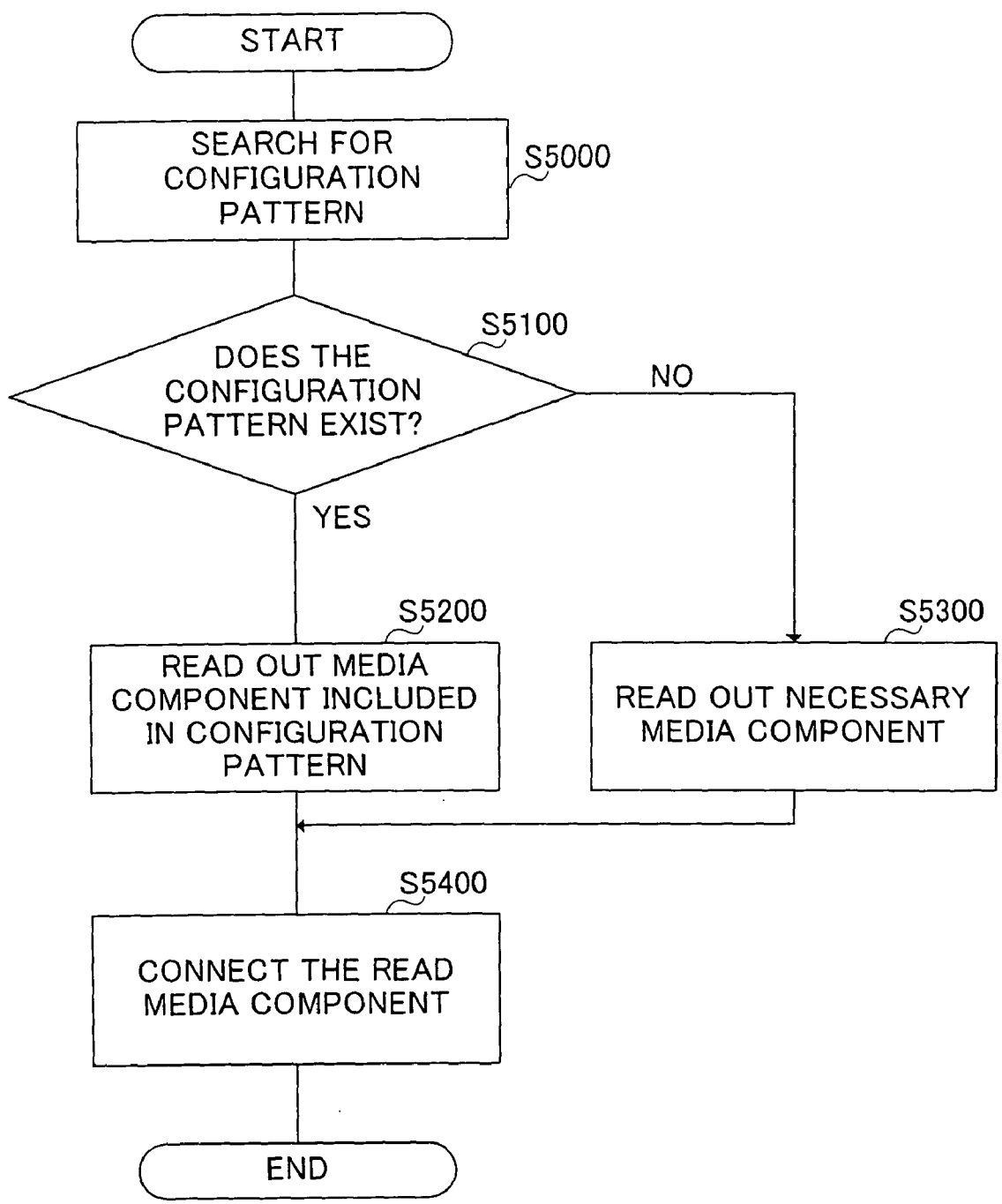
FIG. 15 is a flowchart describing an operation procedure for a multimedia file playback in accordance with the second embodiment of the present invention.
Figure 16:
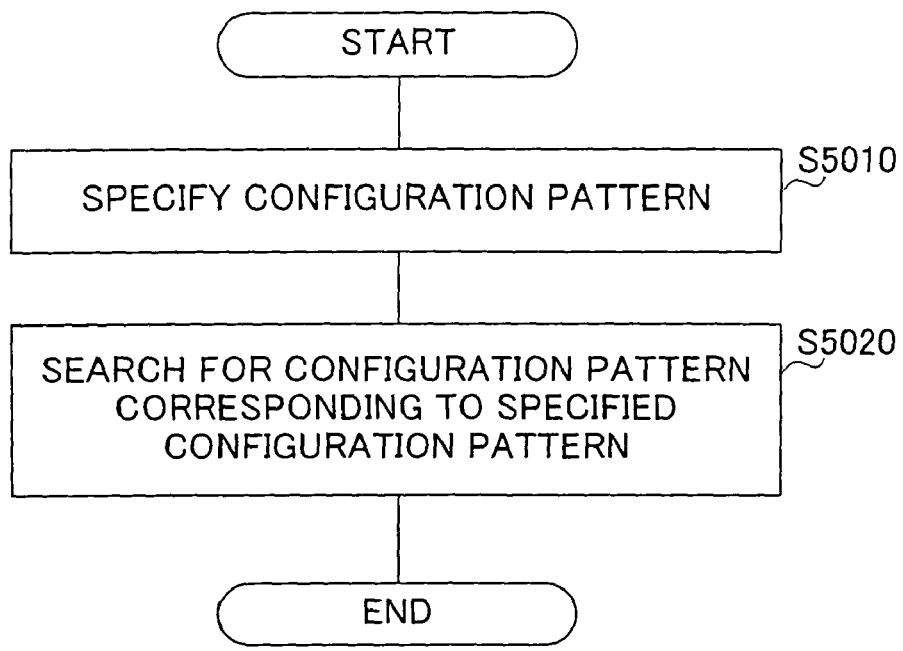
FIG. 16 is a flowchart showing a first example of a configuration pattern search operation in accordance with the second embodiment of the present invention.

Next, a multimedia file playback in data processing apparatus 100 will be explained. FIG. 15 is a flowchart describing the procedure of a multimedia file playback.

First, configuration pattern search section 202 conducts a search as to whether a configuration pattern suitable for the present processing is in component configuration database 201 (S5000), and, if such a configuration pattern exists in component configuration database 201 (S5100: YES), proceeds to step S5200, while, if such a configuration operation pattern is not in component configuration database 201 (S5100: NO), proceeds to step S5300.

In step S5200, media determining section 205 reads the body of media components included in the configuration pattern from media component database 101. On the other hand, in step S5300, media determining section 205 reads the body of necessary components from the upstream end from media component database 101 in sequence. That is, the same operation takes place as in the first embodiment.

Then, media control section 208 connects the read media components.

Figure 17:
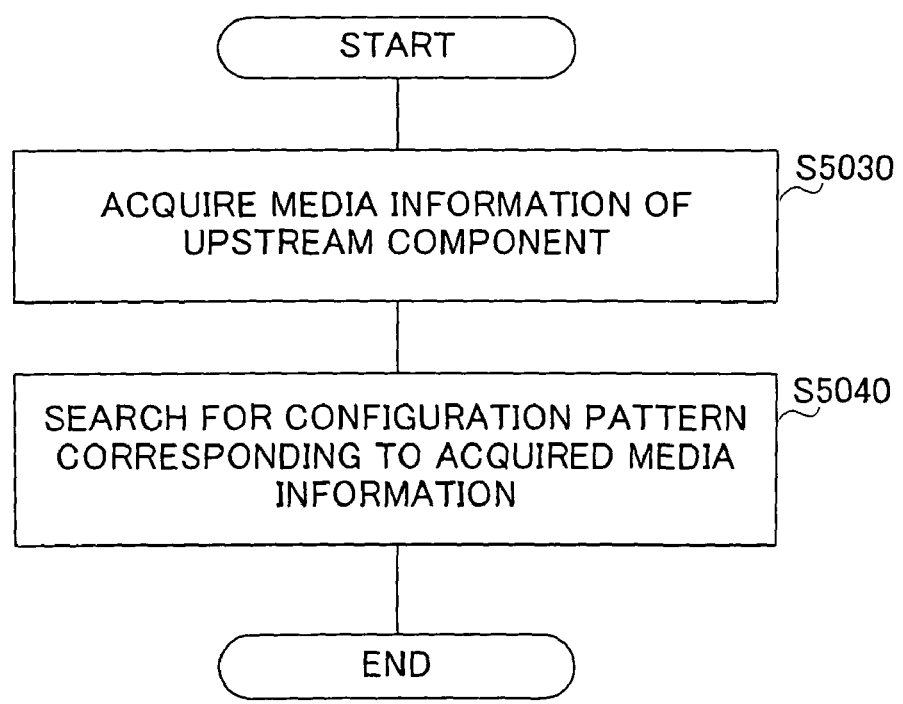
FIG. 17 is a flowchart describing a second example of a configuration pattern search operation in accordance with the second embodiment of the present invention.

Now, the operation in above step S5000 will be described in detail. Here, two sample operations will be described with reference to FIG. 16 and FIG. 17. In the sample operation of FIG. 16, input section 206 specifies a configuration pattern (S5010), and configuration pattern search section 202 searches for a configuration pattern corresponding to the specified configuration pattern (that is, the same configuration pattern as the specified configuration pattern). Moreover, in the sample operation of FIG. 17, the media type determining functions acquire the media information of an upstream component (S5030), and configuration pattern search section 202 utilizes the determining functions in component configuration database 201 and searches for a configuration pattern corresponding to the acquired media information. The operation of FIG. 17 is performed, for instance, in the absence of configuration pattern specification such as described with reference to FIG. 16.

As to the method of specifying a configuration pattern in above step S5010, an example is a method whereby, when an application is activated by input into input section input section 206 by the user, configuration patterns corresponding to the application will be notified to configuration pattern search section 202.

Figure 18:
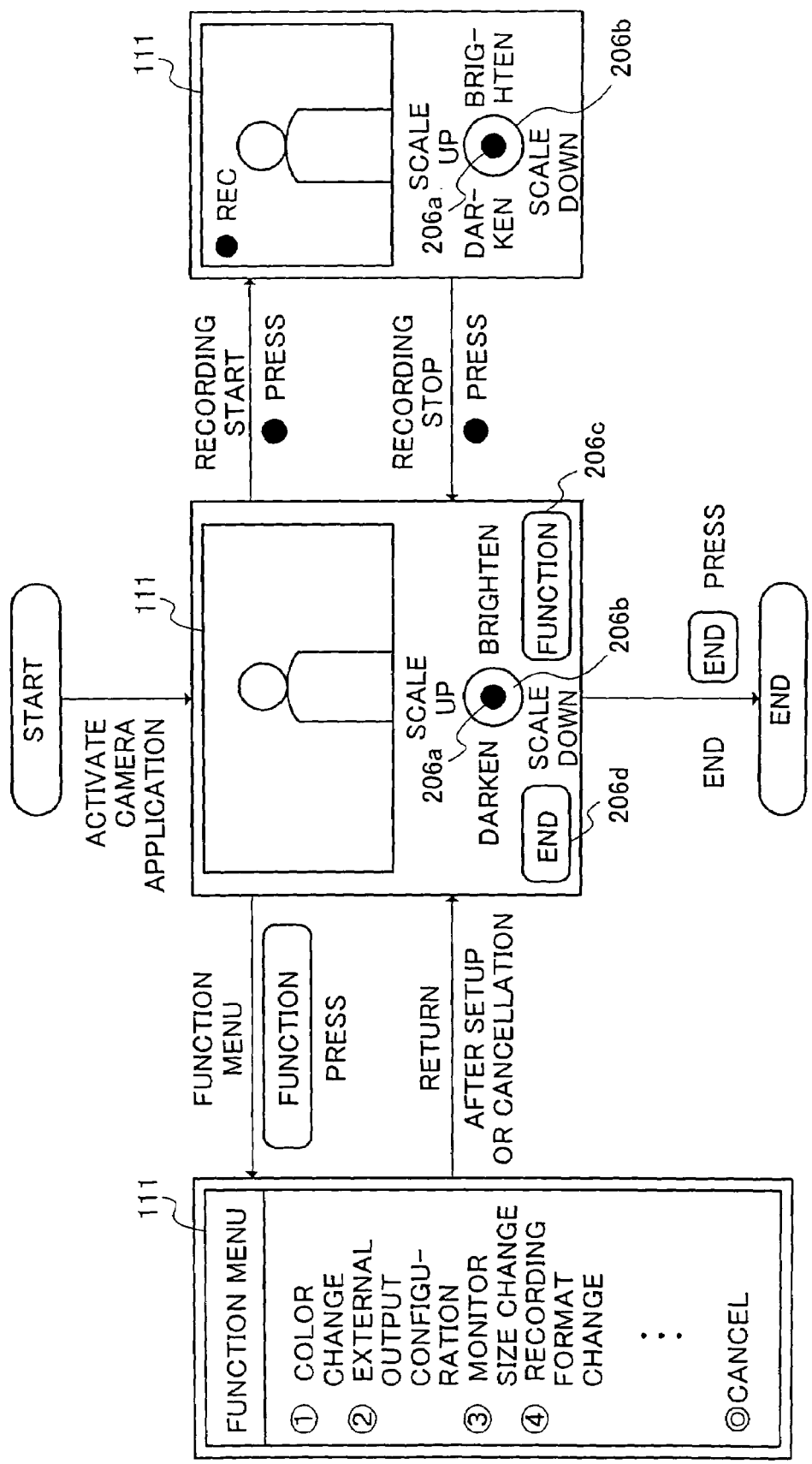
FIG. 18 is a diagram showing an example of a display monitor in accordance with the second embodiment of the present invention.

Moreover, an example of the application that is activated here is a camera application. FIG. 18 is a diagram describing the operation while a camera application is activated, and a sample video displayed on video display section 111 in response to the operation.

First, when a camera application is activated, configuration pattern search section 202 notifies configuration pattern search section 202 of the configuration pattern of media components that are suitable for the camera application. Then, configuration pattern search section 202 conducts a search for a configuration pattern corresponding to the notified configuration pattern (for instance, the configuration pattern "Camera_Record" in FIG. 13). Then, the media components included in this configuration pattern are read out by input section 206 and connected by media control section 208. By this means, a video that is input from an internal camera (not shown) is displayed on video display section 111. Thereafter, when button 206a for recording start/stop is pressed, recording of the video from the camera starts. Moreover, when button 206a is pressed again, input section 206 detects this and the recording of the video stops.

Additionally, when function button 206c is pressed, input section 206 detects this, and a function menu is displayed on video display section 111, which enables implementation of configuration functions such as color tone change, external output configuration, monitor size change, and recording format change. For instance, color change refers to the function that brightens the color of a video by pressing the right portion of button 206b and darkens the color of the video when the left portion of button 206b is pressed. Moreover, monitor size change refers to the function that increases the monitor size when the upper portion of button 206b is pressed and reduces the monitor size when the lower portion of button 206b is pressed.

To implement the above configuration functions, media component configuration patterns that are suitable for the respective configuration functions are predetermined. When the user instructs to implement any of the configuration functions, a search for the configuration pattern corresponding to the instruction is conducted, and the media components included in the configuration pattern are read out and connected, and the configuration function of the instruction is thus implemented. Then, when the configuration is complete or when the configuration is cancelled, the function menu display ends. Additionally, when input section 206d is pressed, input section 206 detects this, and the camera application ends.

Figure 19:
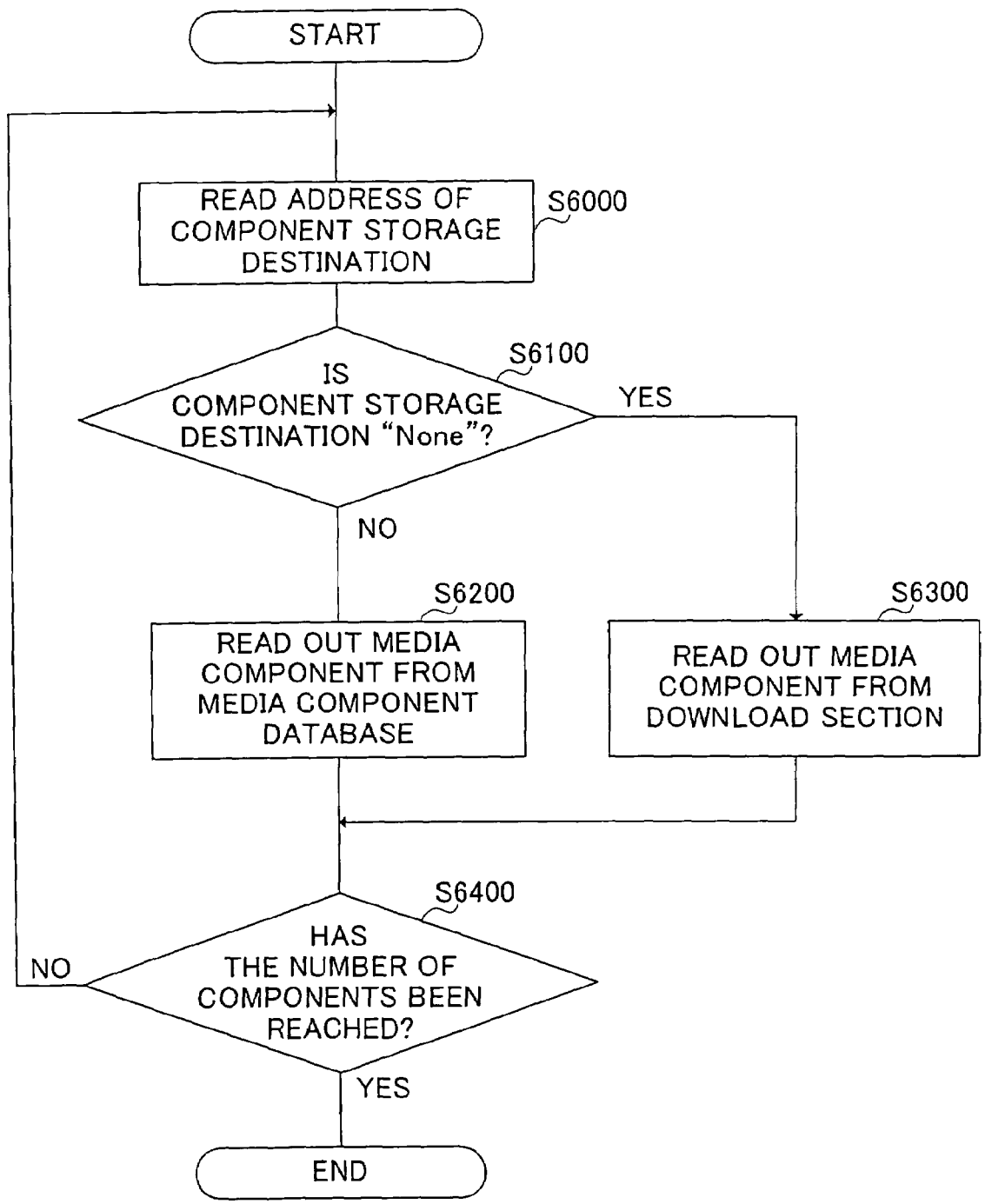
FIG. 19 is a flowchart describing a reading procedure of a media component included in a configuration pattern in accordance with the second embodiment of the present invention.

Next, the operation in step S5200 of FIG. 15 will be described in detail. FIG. 19 is a flowchart describing the procedure of reading media components included in a configuration pattern.

First, media determining section 205 makes reference to the address of component storage destination described in a holding table of a relevant configuration pattern (S6000). Then, if the component storage destination is not "None" (for instance, the address {0×0200} (S6100: NO), the components are read out from the above address in media component database 101 (S6200). On the other hand, when the component storage destination is "None" (S6100: YES), media determining section 205 makes reference to the component location described in the holding table (for instance, the address {http://hogehoge.hoge/cam_cap} and notifies it to download section 203, and download section 203 downloads the pertinent media components from the above component location in media component database server 220 connected via network 210, and media determining section 205 reads the media components from download section 203 (S6300).

Incidentally, decisions as to whether or not a component storage destination is made "None" are made in accordance with the frequency of use of the media components.

Then, whether or not the number of the read media components reaches the number of components described in the holding table is determined (S6400), and the procedure ends if the number of components is reached, while the procedure returns to step S6000 and is repeated if the number of components is not reached.

Figure 20:
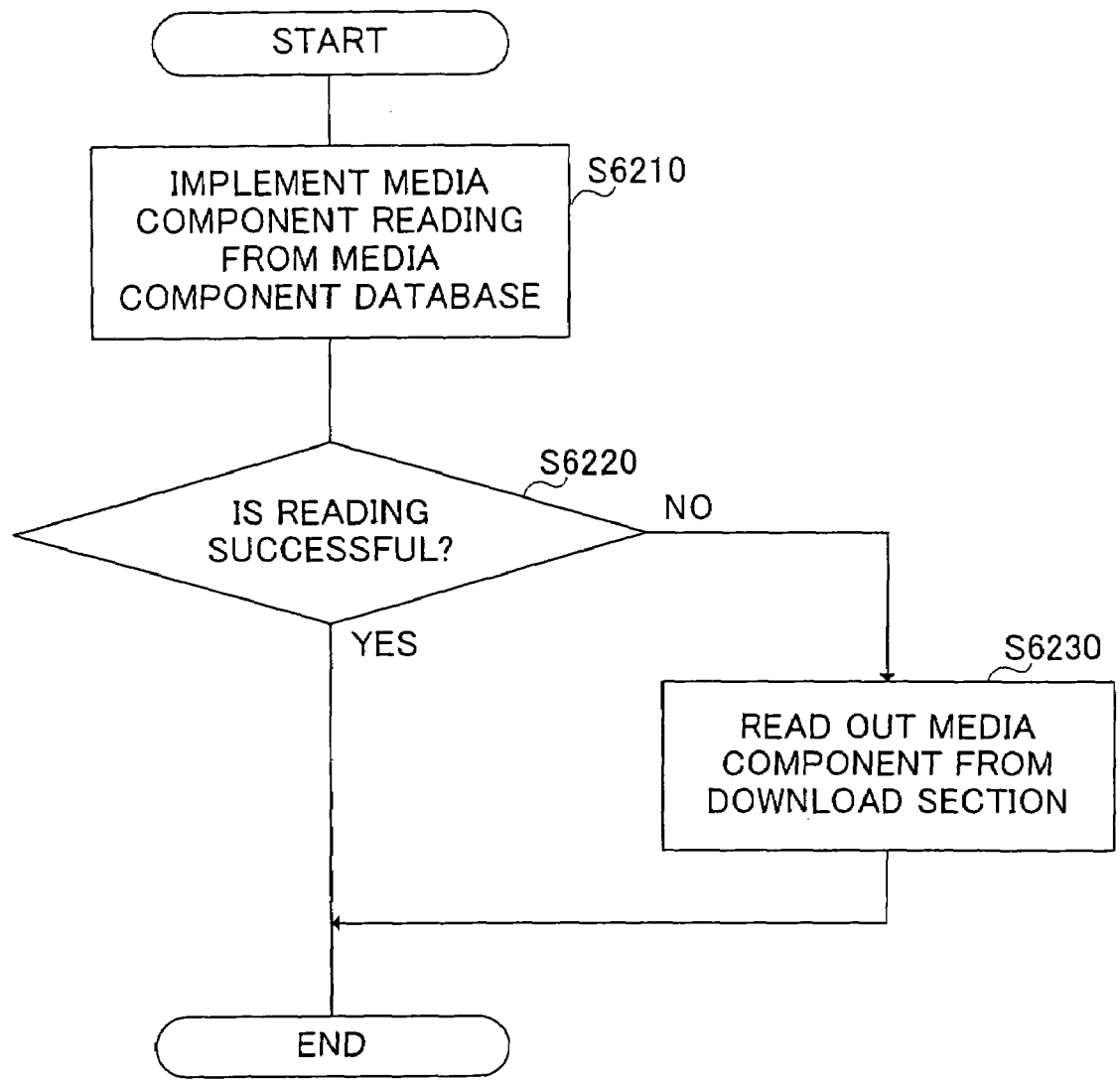
FIG. 20 is a flowchart describing a media component reading operation from a media component database in accordance with the second embodiment of the present invention.

FIG. 20 is a flowchart showing in detail the operation in step S6200 in FIG. 19, that is, the reading of media components from component configuration database 201.

First, based on the component storage destinations described in the holding table, relevant media components are read from media component database 101 (S6210). When the reading is successful (S6220: YES), the processing ends. On the other hand, when the reading is unsuccessful (S6220: NO), media determining section 205 downloads the relevant media components from media component database server 220 via network 210, into download section 203 (S6230).

Figure 21:
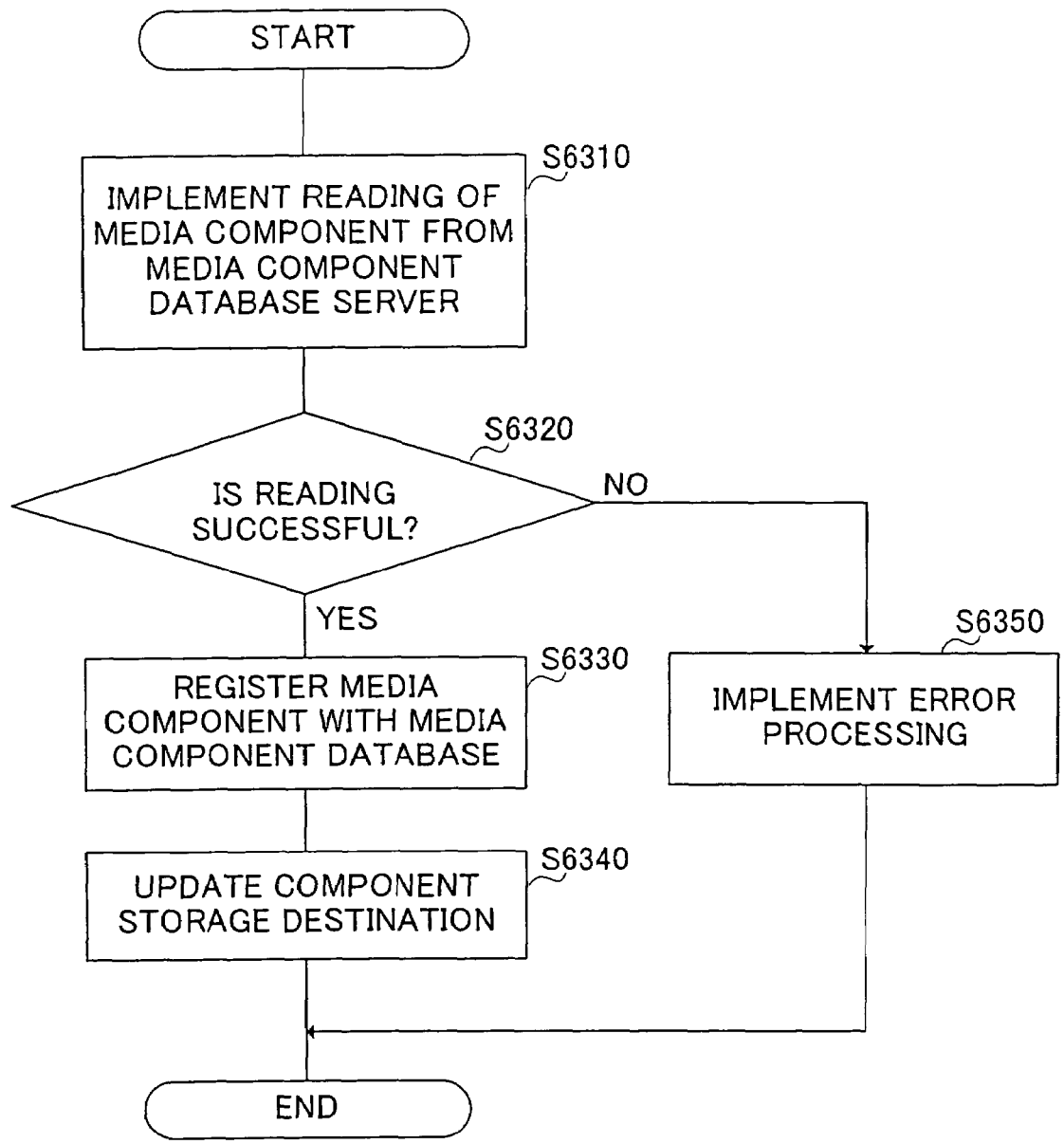
FIG. 21 is a flowchart describing a media component reading operation from a download section in accordance with the second embodiment of the present invention.

FIG. 21 is a flowchart showing in detail the operation in step S6300 in FIG. 19, that is, the reading of media components from download section 203.

First, media determining section 205 downloads media components from media component database server 220 via network 210 into download section 203 and reads out the downloaded media components from download section 203 (S6310). When the reading is successful (S6320: YES), media determining section 205 registers the downloaded media components with media component database 101 (S6330), and configuration pattern search section 202 updates the component storage destinations described in the holding table (S6340). On the other hand, when the reading is unsuccessful (S6320: NO), in response to this effect that the media component cannot be read, error processing is performed (S6350).

As described above, according to the present embodiment, a configuration pattern that has been successful in the past is stored in component configuration database 201, and, when the same processing as for this configuration pattern becomes necessary, this configuration pattern is searched out from component configuration database 201, and only those media components that are included in this searched configuration pattern are read out, so that it is possible to effectively reduce time to acquire desired media components.

Moreover, download section 203 that can be connected to outside data processing apparatus 200 is provided and downloads media components that are necessary to implement given processing and yet not memorized inside external data processing apparatus 200, from external media component database server 220 via network 210, so that when, for instance, new media components need to be acquired, it is possible to download it from media component database server 220 promptly, and, moreover, there is no need to store media components of low use frequency in media component database 101 and memory in media component database 101 can be used effectively.

Incidentally, although download section 203 acquires media components from media component database server 220, the method of acquiring media components from the outside is not limited to this. For instance, if a recording medium that stores components can be connected directly to data processing apparatus 200, necessary components can be downloaded from this recording medium.

Moreover, the present invention is by no means limited to the above described embodiments and can adopt various forms of embodiment without departing from the scope of the present invention. For instance, the above data processing method can be implemented in the form of computer software. That is, such a configuration is possible in which a program that executes the data processing method as described in the above embodiments is recoded in a recording medium such as a ROM (Read Only Memory) and this program is operated by means of a CPU (Central Processing Unit).

This application is based on Japanese Patent Applications No.2002-284164 filed on Sep. 27, 2002 and No. 2003-305258 filed on Aug. 28, 2003, entire content of which is expressly incorporated herein by reference.

INDUSTRIAL APPLICABILITY

The data processing apparatus, the data processing method, and the data processing program of the present invention have the effect of making reconstruction of database unnecessary even upon introduction of new components and are suitable for implementing processing by reading components configured of software parts assemble to implement a given function.

What is claimed is:
1. A data processing apparatus, comprising:
a processor that performs a plurality of processes on data using a plurality of processing components;
a component database that stores:
a plurality of processing components, each of which performs a predetermined process;
a plurality of type determining functions, corresponding to the plurality of processing components; and
a plurality of type determining function entries that refer to the plurality of type determining functions; and
a determiner that searches through the plurality of processing components by reading at least one of the plurality of type determining function entries, reading at least one type determining function referred to by the at least one read type determining function entry, and determining whether a stored processing component corresponding to the at least one read type determining function is suitable for use as a processing component.

2. The data processing apparatus according to claim 1, wherein said determiner reads the plurality of type determining function entries sequentially every time said determiner searches through the plurality of processing components.

3. The data processing apparatus according to claim 1, wherein said component database stores each of the plurality of type determining functions within a corresponding stored processing component.

4. The data processing apparatus according to claim 1, wherein each of the plurality of type determining function entries is associated with one of the plurality of stored processing components.

5. The data processing apparatus according to claim 1, wherein said processor selects a stored processing component suitable for use as a processing component for a next processing by reading file information of data to be processed, and providing the file information to said determiner.

6. The data processing apparatus according to claim 1, further comprising:
a component configuration database that stores configuration patterns of stored processing components; and
a configuration pattern searcher that searches the stored configuration patterns for a configuration pattern suitable for a process to be performed, based on file information of data to be processed.

7. The data processing apparatus according to claim 6, further comprising a downloader configured to connect, via a network, to a database server which stores processing components, wherein said downloader acquires a necessary processing component from said database server when it is determined that the component configuration database does not include a configuration pattern suitable for the process to be performed.

8. The data processing apparatus according to claim 7, wherein said downloader acquires a necessary processing component from a recording medium that is connected to said data processing apparatus and that stores processing components.

9. The data processing apparatus according to claim 7, wherein when said downloader acquires a processing component, said downloader stores the acquired processing component in said component database, and said component configuration database stores information that indicates a storage destination of the acquired processing component stored in said component database.

10. A data processing method, comprising:
storing, in a component database:
a plurality of processing components, each of which performs a predetermined process;
a plurality of type determining functions, corresponding to respective ones of the plurality of processing components; and
a plurality of type determining function entries that refer to the plurality of type determining functions;
searching through the plurality of processing components by reading at least one of the plurality of type determining function entries, reading at least one type determining function referred to by the at least one read type determining function entry, and determining whether a stored processing component corresponding to the at least one read type determining function is suitable for use as a processing component; and
performing at least one process on data using at least one of the plurality of processing components.

11. The data processing method according to claim 10, wherein each of the plurality of type determining function entries is associated with one of the plurality of stored processing components.

12. The data processing method according to claim 10, further comprising reading file information of data to be processed, wherein the searching is based on the read file information.

13. The data processing method according to claim 10, further comprising:
storing, in a component configuration database, configuration patterns of stored processing components; and
searching the stored configuration patterns for a configuration pattern suitable for a process to be performed, based on file information of data to be processed.

14. The data processing method according to claim 10, further comprising, when it is determined that the component configuration database does not include a configuration pattern suitable for the process to be performed:
connecting, via a network, to a database server which stores processing components; and
acquiring a necessary processing component from the database server.

15. The data processing method according to claim 14, further comprising, when the necessary processing component is acquired:
storing, in the component database, the acquired processing component; and
storing, in the component configuration database, information indicating a storage destination of the acquired processing component in the component database.

16. A computer-readable medium which stores a data processing program, the program comprising:
storing code that stores, in a component database:
a plurality of processing components, each of which performs a predetermined process;
a plurality of type determining functions, respectively corresponding to the plurality of processing components; and
a plurality of type determining function entries that refer to the plurality of type determining functions;
searching code that searches through the plurality of processing components by reading at least one of the plurality of type determining function entries, reading at least one type determining function referred to by the at least one read type determining function entry, and determining whether a stored processing component corresponding to the at least one read type determining function is suitable for use as a processing component; and
processing code that performs at least one process on data using at least one of the plurality of processing components.

17. The computer-readable medium according to claim 16, wherein the program further comprises file information reading code that reads file information of data to be processed, wherein the searching code searches based on the read file information.

18. The computer-readable medium according to claim 16, wherein the program further comprises:
storing code that stores, in a component configuration database, configuration patterns of stored processing components; and
searching code that searches the stored configuration patterns for a configuration pattern suitable for a process to be performed, based on file information of data to be processed.

19. The computer-readable medium according to claim 16, wherein the program further comprises:
connecting code that connects, via a network, to a database server which stores processing components, when it is determined that the component configuration database does not include a configuration pattern suitable for the process to be performed; and
acquiring code that acquires a necessary processing component from the database server.

20. The computer-readable medium according to claim 19, wherein the program further comprises:
storing code that stores, in the component database, the acquired processing component; and
storing code that stores, in the component configuration database, information indicating a storage destination of the acquired processing component in the component database.

* * * * *